United States Patent [19]
Motoda

[11] 3,850,307
[45] Nov. 26, 1974

[54] ARTICLE HANDLING APPARATUS
[75] Inventor: Kenro Motoda, Tokyo, Japan
[73] Assignee: Motoda Electronics Co., Ltd., Tokyo, Japan
[22] Filed: Nov. 13, 1973
[21] Appl. No.: 415,447

[30] Foreign Application Priority Data
Nov. 14, 1972   Japan.............................. 47-113438

[52] U.S. Cl...... 212/59 R, 214/130 R, 214/DIG. 10
[51] Int. Cl............................................ B66c 23/04
[58] Field of Search........... 214/1 BD, 1 BV, 130 R, 214/131 R, 132, DIG. 10, 133, 134, 140, 142, 148, 147, 762, 763, 765, 770, 772, 777, 773, 779; 212/42, 59 R, 42.5, 43, 44, 62, 58 R

[56] References Cited
UNITED STATES PATENTS
| | | | |
|---|---|---|---|
| 2,500,815 | 3/1950 | Gerli et al................ | 214/DIG. 10 X |
| 3,743,126 | 7/1973 | Seaberg.......................... | 214/140 X |
| 3,790,001 | 2/1974 | Schnell..................... | 214/DIG. 10 X |

FOREIGN PATENTS OR APPLICATIONS
| | | | |
|---|---|---|---|
| 1,558,134 | 1/1969 | France.............................. | 212/59 R |
| 1,125,981 | 9/1968 | Great Britain........................ | 212/59 |

Primary Examiner—Frank E. Werner
Attorney, Agent, or Firm—Cushman, Darby & Cushman

[57] ABSTRACT

An article handling apparatus includes an arm which comprises a parallel linkage consisting of four links and is pivoted through a pivot to a support head, a motor provided at the free end of one of two links not coupled by the pivot, a carrier connected to the free end of the other link for carrying an article to be transported, a chain driven by the motor for lifting and lowering the arm and connected at one end to a mount fixed to that portion of said one link where a straight line including the free end of said other link and the pivot passes, and adjusting device provided on the support head for moving the chain horizontally, whereby the intermediate portion of the chain between the mount and support head is made perpendicular to the horizontal so that no change takes place in tension applied to the chain while the article is transported horizontally.

8 Claims, 5 Drawing Figures

ARTICLE HANDLING APPARATUS

This invention relates to an article handling apparatus for transporting an article to a desired position, and more particularly for moving a relatively small article within a limited area.

As apparatus of this type, there are conventionally known a small-sized crane, hoist, block etc. However it is required that rails and girders travelled on the rails be prepared in a factory, warehouse, or works. Furthermore, the apparatus is bulky and complicated in design as well as difficult in handling. Thus where an article to be handled is not too weighty and the working area is small, no sufficient operational capability can be attained with the conventional apparatus. MOreover, it does not pay from the standpoint of costs.

As an article handling apparatus of such a type as located on a floor, there is one provided with an arm which is rotated about an upright support and is movable up and down as well as in a horizontal direction, and adapted to hold or suspend an article at the free end of the arm. There is another apparatus equipped with a rotary arm which is pivoted at a support and is pivotally rotatable in a plane including the support and around the support as well as a movable arm movable along said rotary arm, and adapted to hold or suspend an article at the free end of the movable arm. With these apparatus of floor type, however, if the length of the movable arm is varied, a torque applied to the portion for holding the movable arm is varied. Particularly in case of the latter apparatus, a torque applied to the portion for holding the movable arm is varied due to the variation in inclination angle as well as the variation in length of the movable arm. Since a power for moving the movable arm or rotary arm is varied due to the inclination angle of the rotary arm and the length of the movable arm, a load applied to a power supply device is varied with the resultant disadvantage.

It is accordingly the object of this invention to provide an article handling apparatus simple in design, easy in operation and suitable for transporting an article of relatively light weight in a narrow field.

According to this invention there is provided an article handling apparatus comprising a support, a support head rotatably mounted on the support, an arm for transporting an article, driving means for moving the arm, control means for remotely controlling the driving means, power transmitting means through which the driving means moves the arm, and means for adjusting the position of the power transmitting means.

The arm comprises a first link, a second link disposed parallel with the first link, a third link and a fourth link arranged parallel with the third link.

The fourth link is pivoted to the first link and the second link by a first pivot and a second pivot respectively. Similarly, the third link is pivoted to the first and second links by third and fourth pivots.

The arm is pivoted to the support head by means of the second pivot. At the lower end of the first link is provided the control means to which is fixed holding means for carrying an article to be transported. At that end of the third link which is remote from the first link, the driving means is mounted.

The power transmitting means comprises a flexible string-shaped element, for example, a chain, and has one end fixed to a mount so provided on the third link as to align with the lower end of the first link and the second pivot and the other end of the third link. The intermediate portions of the power transmitting means engage a rotary member such as a sprocket wheel disposed adjacent to the mount and rotatably mounted on the adjusting means and other rotary member such as a sprocket wheel rotated by the driving means. When the rotary member on the driving means is rotated, the driving means is run so as to lift or lower the arm. The adjusting means also includes a rail mounted horizontally on the support head, and a sliding member having a roller which rolls on the rail so as to cause the sliding member to move horizontally. When an article is loaded on the holding means and/or the driving means is operated, force is applied to the power transmitting means therealong. If the force between the mount and the rotary member (i.e., the portion of the transmitting means therebetween) is not perpendicular to the rail, the sliding member moves on the rail together with the roller until the force is directed normal to the rail so that the force is parallel with the force of gravity exerted on the article to be transported. Thus, the magnitude of the force applied to the power transmitting means or tension therein is proportional to the weight of the article carried by the holding means even if the arm takes any position, and a change in tension in the power transmitting means which may impart an undesirable shock to the driving means is reduced to a minimum. The driving means may comprise an electric motor remotely controlled by the control means.

Preferably, the arm further comprises a fifth link and two sixth links disposed parallel with the first link and the fourth link respectively. A carrier which supports the control means is pivoted to the first and fifth links through a fifth pivot and a sixth pivot, respectively, and a pair of connection plates are also pivoted to the first and fifth links through the first pivot and a seventh pivot which lies on a line passing the first pivot and is parallel to a first line passing the fifth and sixth pivots. The sixth links have each one end pivoted to the respective connection plate through an eighth pivot and the other end to the support head through a ninth pivot which lies on a second line passing the second pivot and is parallel to a line passing the first and eighth pivots. Thus, a set of the first link, fifth link, carrier and connection plates and a set of the fourth link, sixth links, connection plates and support head so constitute parallel linkages. It is understood that the carrier does not change its angular position when the arm takes any pose, whereby the article carried by the holding means is never swung during the transportation of the article.

This invention will be described by way of example with reference to the accompanying drawings, in which.

Same reference numbers and characters are employed throughout the specification to denote same parts or elements.

Figure 1:
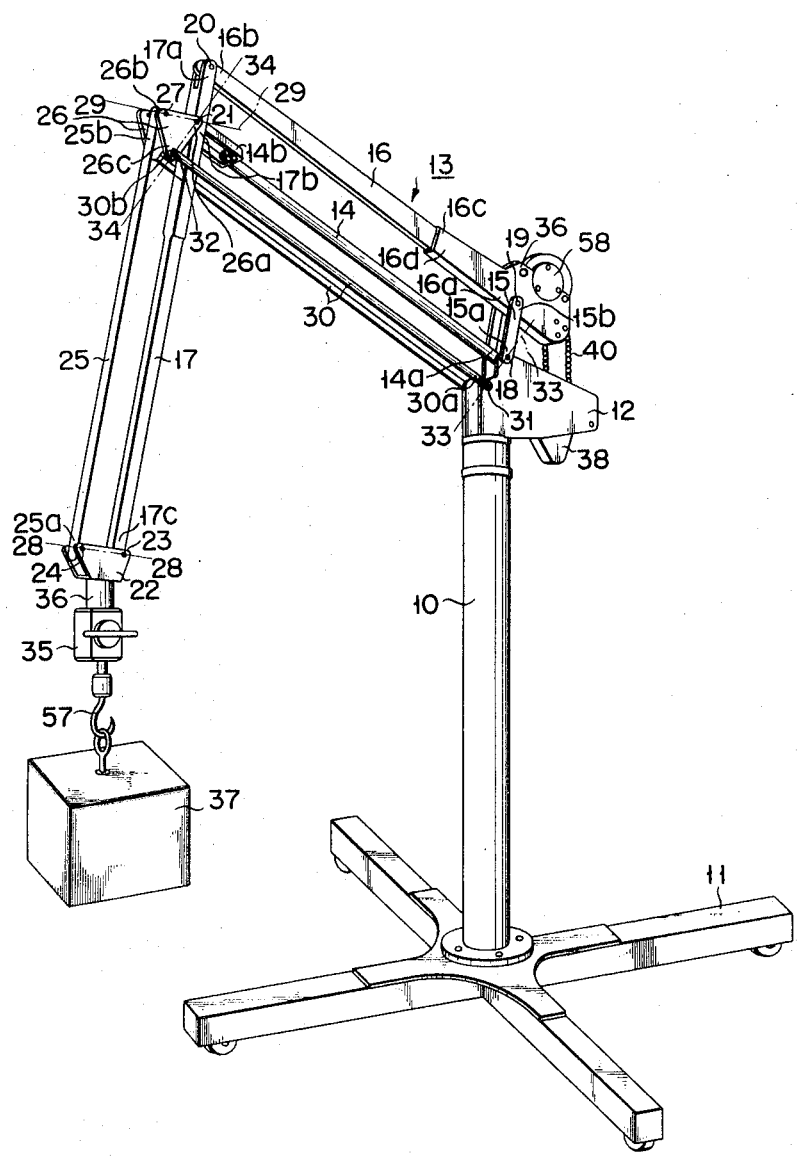
FIG. 1 is a perspective view of an article handling apparatus according to this invention.

Referring to FIG. 1 a support 10 stands upright on legs 11 freely movable through respective casters on a substantially flat floor, ground etc. The support 10 may be fixed to a floor, ground etc. At the upper end of the support 10 a support head 12 is mounted so as to pivot about the axis of the support 10.

An arm 13 includes four links 14, 15, 16 and 17 which constitute a parallel linkage. An intermediate portion 14a adjacent to a rear end of the link 14 and the lower end 15a of the link 15 are pivoted through a pivot 18 to the support head 12. The link 16 has a rear end portion 16a pivoted through a pivot 19 to the upper end 15b of the link 15 and a forward end 16b pivoted through a pivot 20 to the upper end 17a of the link 17. The intermediate portion 17b a little lower than the upper end of the link 17 is pivoted through a pivot 21 to the forward end 14b of the link 14. The links 14 and 16 are always parallel to each other and the links 15 and 17 are always parallel to each other. A carrier 22 is pivoted through a pivot 23 to a lower end 17c of the link 17 and to a lower end 25a of a link 25 through a pivot 24 disposed parallel to and in front of the link 17. Connecting means i.e., a pair of inverted-triangular connection plates 26 has a rear apex 26a pivoted through a pivot 21 to the forward end 14b of the link 14 and a forward apex 26b pivoted through a pivot 27 to the upper end 25b of the link 25. A straight line 28—28 passing the pivots 23 and 24 is parallel to a straight line 29—29 passing the pivots 21 and 27. Thus, the link 25, connection plates 26, link 17 and carrier 22 constitute a parallel linkage. A pair of links 30 are disposed parallel to the link 14. The rear end 30a of each link 30 is pivoted through a pivot 31 to the support head 12 and the forward end 30b of each link 30 is pivoted through a pivot 32 to a lower apex 26c of the connection plates 26. A straight line 33—33 passing the pivots 18 and 31 is parallel to a straight line 34—34 passing the pivots 21 and 32. Thus, the links 30, connection plates 26, link 14 and support head 12 constitute a parallel linkage.

Though the two connection plates 26 and two links 30 are used in this embodiment, it will be possible that one connection plate 26 and one link 30 are used instead. The pivots 18 and 31 do not change their positions relative to the support head 12. From the principle of the parallel linkage, it is understood that, when the arm 13 is moved, the connection plate 26 does not swing about the pivot 21 or 27.

The carrier 22 does not likewise swing about the pivot 23 or 24. A control means or control box 35 is fixed through a neck portion 36 to the lower end of the carrier 22 and is used for operating a driving means as will be later described. To the lower end of the control box 35 is provided holding means for holding an article 37 to be carried, for example, a hook 57 rotatable about a vertical axis thereof.

Figure 2:
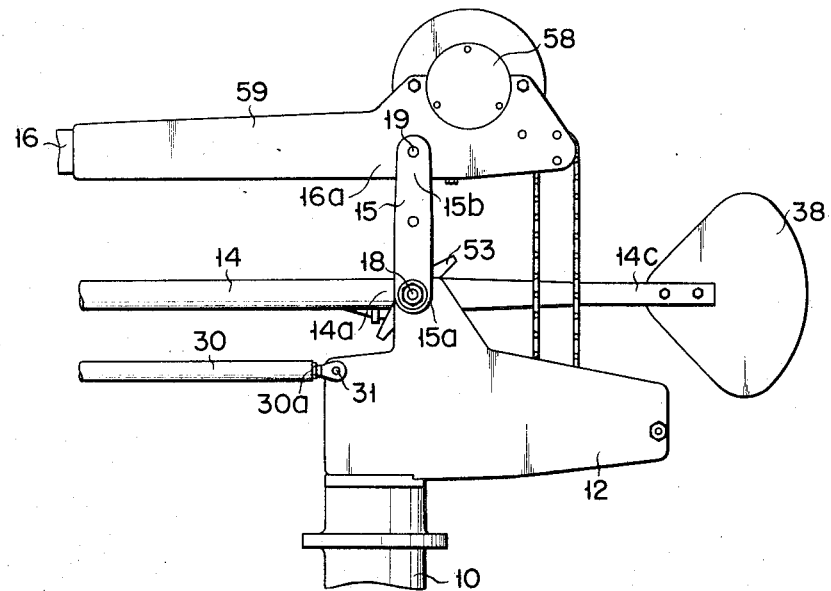
FIG. 2 is a side view showing an essential part of the apparatus of FIG. 1.

The portion extending from the intermediate portion 16c of the link 16 to a rear end portion 16a constitutes a driving means mounting portion 59. On the intermediate portion 16c of the link 16 driving means or a motor 58 is mounted. When the article 37 is not loaded on the hook 57, a counterweight 38 fixed to the rear end of the link 14 is balanced with the weight of the arm 13 (see FIGS. 2 and 3). This permits the arm 13 to be easily operated with a small force.

Figure 3:
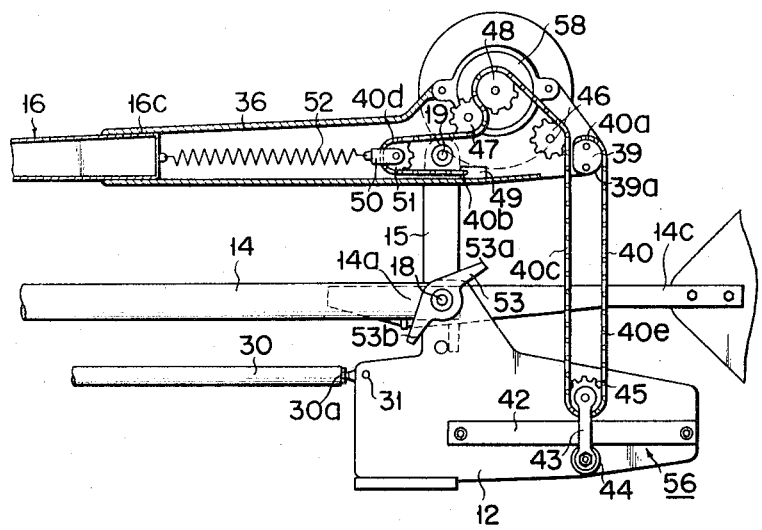
FIG. 3 is a structural detail of the essential part of the apparatus of FIG. 1.

In FIG. 3 a mount 39 whose right hand side constitutes a circular peripheral surface 39a is mounted at the rear end portion 16a of the link 16. To the top of the mount 39 or its neighborhood one end 40a of string-like power transmitting means or a chain 40 is fixed in such a manner that the adjacent portion of the chain 40 to said one end 40a contacts the circular peripheral surface 39a of the mount 39. The mount 39 is so arranged that the peripheral surface 39a substantially falls on a straight line 41—41 (FIG. 4) passing the lower end 17c of the link 17a (or the pivot 23) and the pivot 18. Therefore, the links 14, 15, 16 and 17 together with the pivot 23 and the mount 39 constitute a pantagraph. On the support head 12 a rail 42 extends horizontally. A sliding member 43 has at its lower end a roller 44 slidably mounted on the lower surface of the rail 42 to permit the sliding member 43 to be moved horizontally, and at its upper end a rotary member or sprocket wheel 45 rotatably supported. A half of the effective diameter of the sprocket wheel 45 is made equal to the radius of curvature of the peripheral surface 39a of the mount 39. The rail 42, sliding member 43, roller 44 and sprocket wheel 45 constitute adjusting means or adjusting device 56.

Rotary members or sprocket wheels 46 and 47 are mounted at the lower front and lower back of the motor 58 provided on the driving device mounting portion 59, and a rotary member or sprocket wheel 48 is secured to the drive shaft of the motor 58.

As shown in FIG. 3, the chain 40 is suspended from the mount 39, winds around the sprocket wheel 45 and is engaged with sprocket wheels 46, 48 and 47. The other end 40b of the chain 40 is secured by a fixing member 49 to the driving device mounting portion 59. On the support member 50 is rotatably supported a rotary member or sprocket wheel 51 with which a portion 40d of the chain 40 between the sprocket wheel 47 and fixing member 49 is engaged. A compression spring 52 is stretched between the intermediate portion 16c of the link 16 and the support member 50. Since a tension is imparted under the resilient force of a spring 52 to the chain 40, the intermediate portion between both ends 40a and 40b winds around the sprocket wheels 45, 48, 47 and 51, no sagging occurs.

In FIG. 3 a lever 53 is secured at its central portion to the link 14 and adapted to be rotated together with the lever 14. A stop 55 against which the ends 53a and 53b of the lever 53 are abutted is provided on the support head 12 to restrict the movement of the arm 13.

Figure 4:
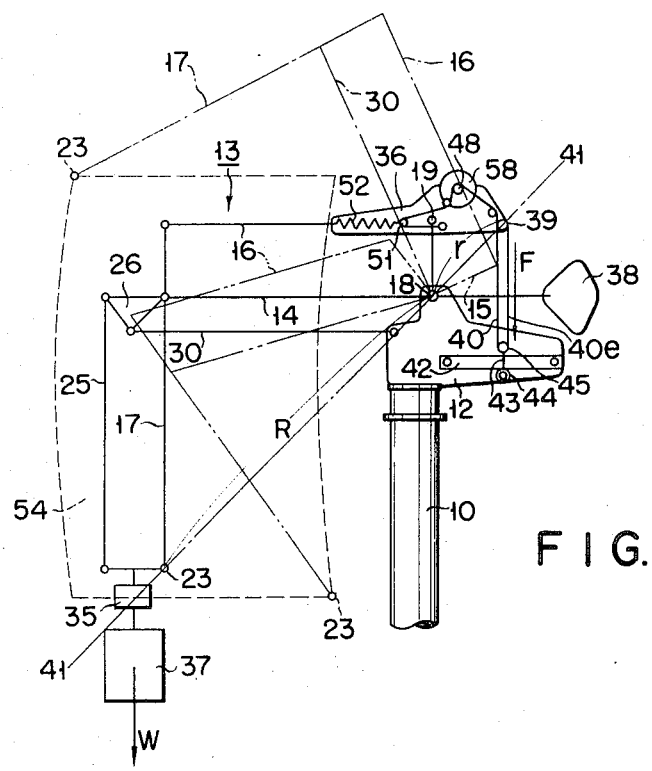
FIG. 4 is an explanatory view showing an operation of the apparatus of FIG. 1.

FIG. 4 shows a schematic diagram of the major part of an apparatus according to this invention. For simplicity, each link is shown by straight lines. In the positions shown by a single-dotted chain line and double-dotted chain line, the links 25 and 30 are omitted.

There will now be described the operation of the present invention. When the motor 58 is remotely driven from the control box 35 to cause the sprocket wheel 48 to be rotated in the counterclockwise direction in FIGS. 1, 3, 4, the portion 40c between the end 40a of the chain 40 and the sprocket wheel 48 is pulled to permit the link 16 to be rotated in the clockwise direction about the pivot 19. This causes the arm 13 to be swung in the clockwise direction to lift the article 37. During the clockwise rotation of the sprocket wheel 48 the portion 40d of the chain 40 between the end 40b of the chain 40 and the sprocket wheel 48 is made longer in length. However, since the end 40b of the chain 40 is pulled leftward in FIGS. 3 and 4 under the action of the spring 52, no sagging takes place and a tension is always imparted under the action of the spring 52 to the chain 40. When the sprocket wheel 48 is rotated in the clockwise direction, the portion 40c of the chain 40 is made longer in length and the link 16 is swung in the counterclockwise direction about the pivot 19 by the weight W of the article 37 or by a pull of the operator. The portion 40d of the chain 40 is made shorter in length against the force of the spring 52. At any case, the chain 40 is not sagged or entangled with the sprocket wheels 45, 46, 48, 47 and 51 etc., since it is biased by the spring 52.

When the article 37 is pulled or pushed leftward in FIGS. 1 and 4, the links 17 and 15 are swung in the clockwise direction about the pivots 21 and 18, and the article 37 is allowed to be moved leftward without requiring a greater force. When article 37 is moved rightward, a similar process is effected. Since, as already stated, the carrier 22 is not swung up and down about the pivot 23 even when the arm 13 takes any position, undesirable swing motion of the article 37 does not take place. This ensures the safe transportation of the article 37.

When the sprocket wheel 48 of the motor 58 is rotated in the clockwise or counterclockwise direction to cause one end 53a or the other end 53b of the lever 53 (FIG. 3) to be abutted against the stop 55, the stopping device (not shown) of the motor 58 is operated to stop the motor 58 and the arm 13 stops its further movement so that the article 37 stops its upward and downward movements. For this reason, the pivot 23 of the arm 13 is movable only within the range 54 defined by a dotted line in FIG. 4 and, damage to the article 37 and destruction to the apparatus due to an excessive operation of the arm 13 can be prevented.

The arm 13, together with the support head 12, can be swivelled manually and/or through a control box 35 about the axis of the support 10.

Figure 5:
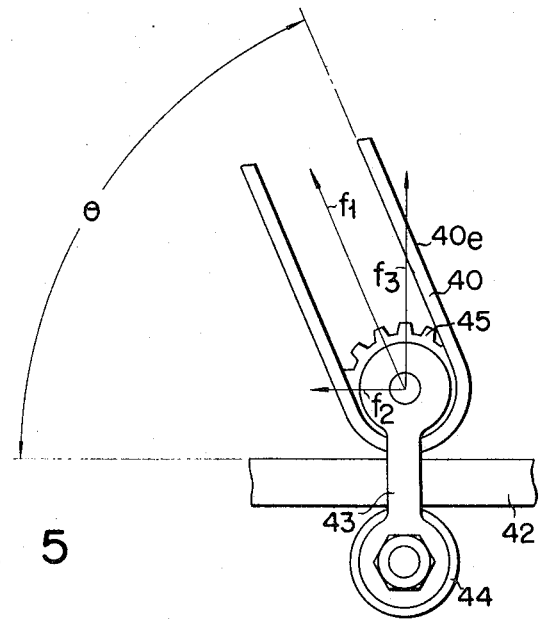
FIG. 5 is an explanatory view showing an operation of an adjusting means.

There will be explained the operation of the adjusting means 56. During the operation of the arm 13 a distance between the mount 39 and the rail 42 is usually varied as well as a distance between the pivot 18 and an intermediate portion 40e of the chain 40 between the mount 39 and the sprocket wheel 45 is varied. And it may happen that the portion 40e does not temporarily make right angles with the rail 42. Suppose, for example, that the portion 40e of the chain 40 is inclined through an angle $\theta$ other than 90° to the rail 42 as shown in FIG. 5. Suppose that $f_1$ be a tension applied to the portion 40e, the tension $f_1$ is divided into a horizontal force $f_2$ (which is equal to $f_1 \cos \theta$) and a vertical force $f_3$ (which is equal to $f_2 \sin \theta$). Therefore, the sliding member 43 is moved along the rail 42 in the direction of the horizontal force $f_2$. As will be evident from FIG. 3, when the portion 40e of the chain 40 makes right angles with the rail 42, the length of the portion 40e is shortest and the horizontal force $f_2$ becomes zero. Thus, the sliding member 43 stops its movement. Therefore, the portion 40e of the chain 40 and the tension $f_1$ applied thereto are always parallel to the direction of a force of gravity.

Suppose that the tension $f_1$ is parallel to the direction of a force of gravity. Referring to FIG. 4, let F be a reaction force to the tension $f_1$ applied to the amount 39 by the chain 40, R a distance between the pivots 23 and 18 and r a distance between the pivot 18 and the mount 40 (FIG. 4), then the reaction force F is parallel to the weight W, and it follows that $Fr = WR$. Since the links 14, 15, 16 and 17 constitute a parallel linkage, and pivots 23, 18 and mount 39 fall on the same straight line 41—41, $r/R$ is always constant. Therefore, if the weight W is constant, then F is made constant irrespective of any pose assumed by the arm 13. This means that, during the horizontal transport of the article 37, no variation in tension occurs in the chain 40.

When the link 16 is swung about the pivot 19, the upper portion of the chain 40 is rolled on, or rolled back from, the peripheral portion 39a of the mount 39. The length so rolled on or rolled back from the peripheral portion 39a is compensated by the rotation of the chain wheel 46 and neither sagging nor excessive pull occurs between the mount 39 and the rail 42. Therefore, the article 37 is not raised or lowered to an unnecessary extent due to the sagging and pull of the chain 40.

Accordingly, the article handling apparatus according to this invention is capable of moving the article 37 to any desired position, without any greater variation in loads applied to the arm 13, motor 58, chain 40 etc. An operator only slightly pushes or pulls the article 37 to transport the article easily while adjusting the height of the article 37 by controlling the drive of the motor 58 through the control box 35. The article handling apparatus can lift, lower and move horizontally the article 37 in the area 55 and can be rotated about the axis of the support 10, so that working area of the apparatus is three-dimensional.

What is claimed is:

1. An article handling apparatus including a support on which a support head is rotatably mounted; an arm comprising first and second links parallel to each other, third and fourth links parallel to each other, a first pivot to which said first and fourth links are pivoted, a second pivot to which said second and fourth links are pivoted, a third pivot to which said first and third links are pivoted and a fourth pivot to which said second and third links are pivoted, said arm being pivotally supported on said support head through said second link; control means provided on one end of said first link; holding means for holding an article disposed below the control means; driving means provided on that one end of the third link which is remote from the first link so that a drive of said driving means is controlled by said control means; a mount provided on the third link and falling on a straight line passing said one end of said first link and second pivot, string-like power transmitting means having one end secured to the mount and operated by said driving means to cause the arm to be swung about the second pivot; and adjusting means having a rotary member wound by that intermediate portion of the power transmitting means which is between the mount and the driving means, said adjusting means being movable horizontally on said support head thereby enabling a force applied to said power transmitting means always to be directed in a vertical direction.

2. An article handling apparatus according to claim 1 in which said adjusting means comprises a rail horizontally mounted on said support head and a sliding member horizontally movable along said rail.

3. An article handling apparatus according to claim 2 in which said power transmitting means comprises a chain having one end connected to said mount and the other end to said third link, and said rotary member comprises a sprocket wheel.

4. An article handling apparatus according to claim 3 in which there is further provided biasing means provided between the third link and biasing said chain so as not to be sagged.

5. An article handling apparatus according to claim 4 in which said biasing means comprises a compression spring.

6. An article handling apparatus according to claim 4 in which said mount has a circular peripheral portion with which one end of the chain is engaged and a sprocket wheel is provided on the third link to mesh with said chain between said sprocket wheel and said driving means.

7. An article handling apparatus according to claim 4 in which said driving means is a motor remotely controlled by said control means.

8. An article handling apparatus according to claim 4 in which said arm further includes a fifth link parallel to said first link, a carrier pivoted through a fifth pivot and a sixth pivot to said one end of said one link and one end of said fifth link respectively, connection means pivoted through said first pivot to said first link and pivoted through a seventh pivot to said fifth link so that a first straight line passing said first and said seventh pivots is parallel to a second straight line passing said fifth and sixth pivots, at least one sixth link provided parallel to said fourth link, one end of said sixth link being pivoted to the support head through an eighth pivot and the other end of said sixth link being pivoted through a ninth pivot to said connection means so that a third straight line passing said ninth and first pivots is parallel to a fourth straight line passing said second and eighth pivots; and said control means is provided on said carrier.

* * * * *